United States Patent [19]

Miyauchi et al.

[11] 4,308,612
[45] Dec. 29, 1981

[54] OPTICAL INFORMATION RECORDING APPARATUS INCLUDING ERROR CHECKING CIRCUIT

[75] Inventors: Toshimitsu Miyauchi, Hachiouji; Yoshito Tsunoda, Mitaka, both of Japan

[73] Assignee: Hitachi, Ltd., Tokyo, Japan

[21] Appl. No.: 105,704

[22] Filed: Dec. 20, 1979

[30] Foreign Application Priority Data

Dec. 27, 1978 [JP] Japan .................................. 53-159840
Nov. 2, 1979 [JP] Japan .................................. 54-141339

[51] Int. Cl.³ .............................................. G11B 7/00
[52] U.S. Cl. ........................................ 369/48; 371/10
[58] Field of Search .................. 179/100.1 G, 100.3 V, 179/100.3 GN; 346/76 L, 108; 358/128.5, 128.6, 129, 130, 132; 360/56, 59; 365/122, 126, 127, 200, 215; 371/8, 10, 12, 13; 369/47, 48, 100, 106, 111, 124

[56] References Cited

U.S. PATENT DOCUMENTS

| | | | |
|---|---|---|---|
| 3,365,706 | 1/1968 | King ....................................... | 365/127 |
| 3,696,344 | 10/1972 | Feinleib et al. ...................... | 365/127 |
| 3,731,290 | 5/1973 | Aagard ................................. | 365/122 |
| 3,795,791 | 3/1974 | Boyer ................................... | 371/12 |
| 4,145,758 | 3/1979 | Drexler et al. ...................... | 365/200 |

*Primary Examiner*—Bernard Konick
*Assistant Examiner*—Donald McElheny, Jr.
*Attorney, Agent, or Firm*—Craig and Antonelli

[57] ABSTRACT

In apparatus wherein a predetermined information signal is recorded on an optical disk by the use of a light beam; an information recording apparatus characterized by provision of a light detector for detecting reflected light caused by the reflection of the light beam by the optical disk, and a checking circuit for detecting the duration for which a maximum peak value of the output from the light detector exists, the recorded state of information on the optical disk being detected on the basis of the output from the detector by the checking circuit.

14 Claims, 19 Drawing Figures

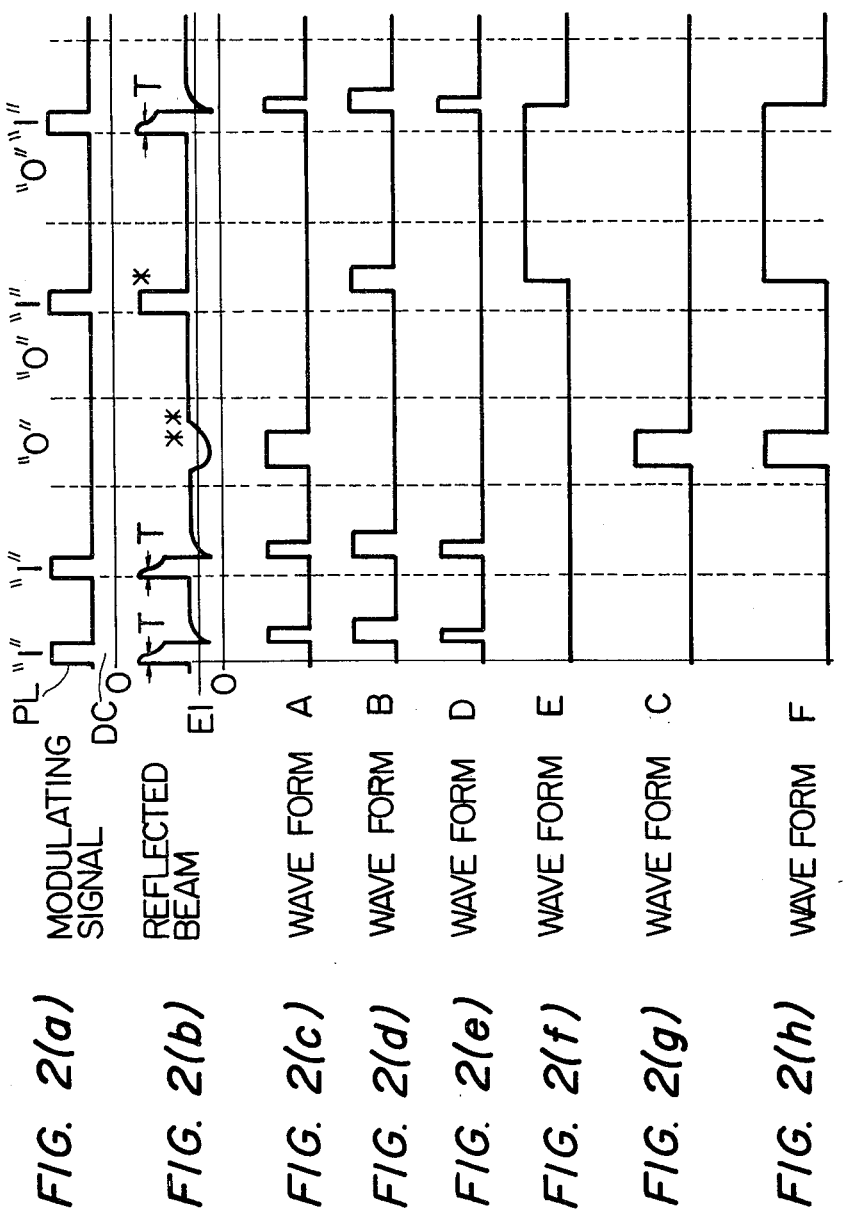

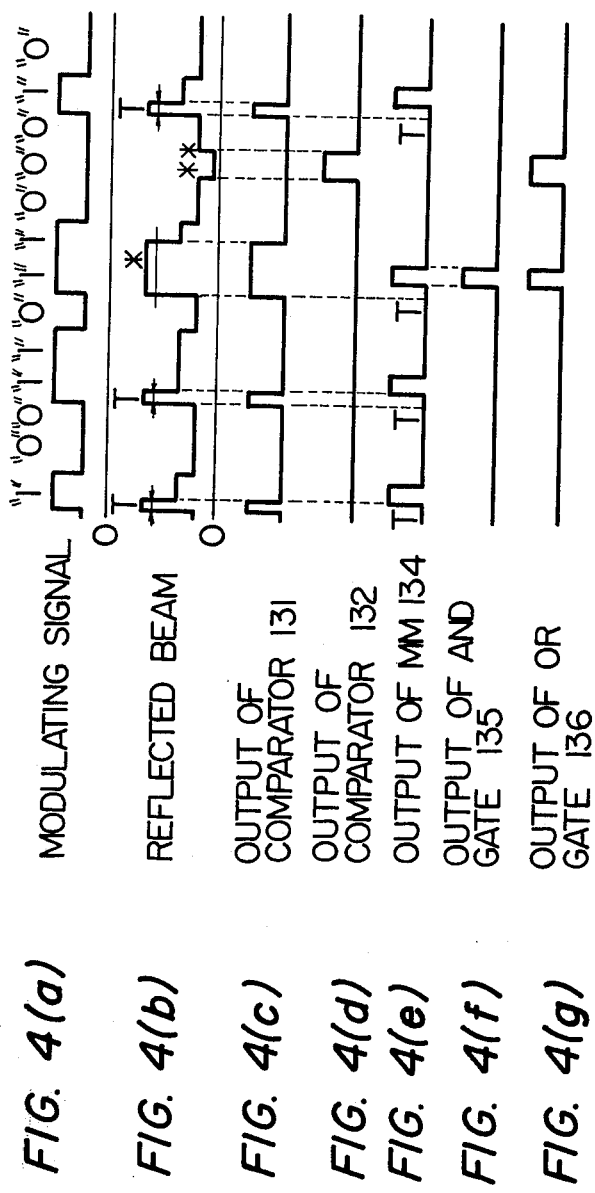

OPTICAL INFORMATION RECORDING APPARATUS INCLUDING ERROR CHECKING CIRCUIT

BACKGROUND OF THE INVENTION

1. Field of the Invention

This invention relates to a recording apparatus which records information in a recording medium on a disk by the use of a light beam. More particularly, it relates to an information recording apparatus in which information can be checked simultaneously with the recording thereof to ascertain that it is correctly recorded.

2. Description of the Prior Art

Heretofore, in apparatuses for recording digital information at a high density, for example, in a magnetic disk system, error checking for inspecting defects in a recording medium before recording has been performed, the read-while-write operation of reading out the information immediately after recording and checking the recorded state has been performed during the recording, and further, an error correction code (ECC) has been added to the signal to be recorded, thereby to sharply enhance the bit error rates of the recorded information.

Also, in an optical disk memory device for optically recording digital information as a sequence of binary "ones" and "zeros" in the form of holes and the absence of holes in the recording medium, it has been necessary to perform the checking operation in order to enhance the bit error rates.

SUMMARY OF THE INVENTION

An object of this invention is to provide an optical information recording apparatus capable of performing a read-while-write operation in which a reflected beam from a recording medium is detected during recording and the recorded data is checked on the basis of the reflected beam while recording information.

In order to accomplish such object, this invention is characterized by the fact that reflected light caused by the reflection of a light beam from an optical disk is detected by a light detector and that the recorded state of information on the optical disk is checked on the basis of a variation in the quantity of the reflected light.

BRIEF DESCRIPTION OF THE DRAWINGS

FIGS. 2(a)-2(h) are operating waveform diagrams for explaining this invention;

FIGS. 4(a)-4(g) are waveform diagrams for explaining the operation of the embodiment shown in FIG. 3;

DESCRIPTION OF THE PREFERRED EMBODIMENTS

Hereunder, this invention will be described with reference to the drawings.

Figure 1:
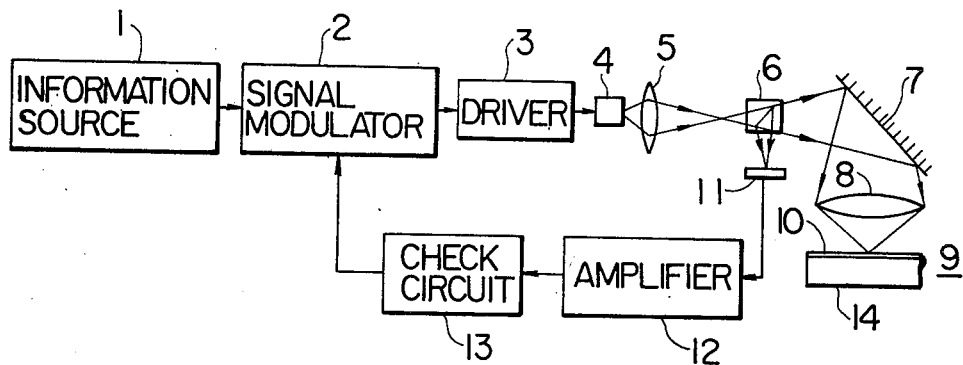
FIG. 1 is a block diagram showing the construction of an embodiment of this invention.

FIG. 1 is a schematic block diagram of an embodiment of this invention, in which parallel data delivered from an information source 1 is serialized by a signal modulator 2 into serial data, which is applied to a driver 3 for a diode laser 4 forming an information light source. A laser beam from the diode laser 4, which is directly subjected to pulse modulation by the driver 3, passes through a lens 5, and a half mirror or beam splitter 6 is reflected by a mirror 7 through a focusing lens 8 and is focused to a spot size of about 1-2 $\mu$m on a recording medium 10 of an optical disk 9. The optical disk 9 is so constructed that a metal (Bi, Al or the like) or chalcogen glass material (As, Ge, Te, Se or the like) to be used as the recording medium 10 is evaporated in the form of a thin film approximately 100-1,000 Å thick on a disk plate 14 made of glass, synthetic plastic material, or the like. The recording medium 10 records the data in selective "on" or "off" states (the presence or absence of a hole) in accordance with the focused light spot. During the recording, a beam reflected from the disk 9 passes back through the same optical path as that for the recording, is again reflected by the mirror 7, is split by the half mirror 6 and is directed to a light detector 11.

The relationship at this time between the modulating signal of the diode laser and the reflection signal detected by the light detector 11 is illustrated in FIGS. 2(a) and 2(b). As seen from FIG. 2(a), the modulating signal of the diode laser 4 has a waveform in which pulse components PL and a direct-current component DC are superposed. When the laser beam modulated by such modulating signal is projected onto the disk 9, the reflected beam from the disk 9 is detected by the detector 11 and the reflection signal as shown in FIG. 2(b) is obtained.

The reflection signal has a maximum peak value for T seconds representing the time during which the temperature of the recording medium 10 rises. When a hole begins to be formed in the recording medium, the pulse component of the reflection signal decreases as the amount of reflected light decreases. In addition, even after the pulse component of the modulating signal becomes nonexistent, the direct-current component of the reflection signal decreases at the trailing edge of the pulse component PL because the medium 10 has the hole and almost no light is reflected. Then the quick recovery of this reflection signal to the normal direct-current component level results from the fact that the medium is moving so that the hole does not remain aligned with the beam.

According to experiments by the inventors, it has been verified that, as illustrated in FIG. 2(b), the reflection signal has a maximum peak value for a period of T seconds during which a temperature rise of the recording medium 10 is produced by the beam, whereupon the reflected beam intensity decreases to about $\frac{1}{3}$ of the maximum peak value when the hole begins to be formed after the intial period of T seconds. Accordingly, if the input beam power is constant, the maximum peak duration time T ought to be constant. However, in the presence of defects (dust, scratches, pinholes, etc.) in the recording medium itself, there occurs the possibility that the duration time T lengthens (a case where no hole is produced in the medium or the possibility that the maximum peak value of the reflected beam does not appear at all (a case where a hole has been already provided in the medium). When a hole already exists in the medium prior to recording, the output of detector 11 during the minimum peak duration period appears as the direct-current component of the laser modulating signal. Among these states, the case where no hole is produced in the medium during the recording period and the case where a hole already exists in the medium prior to recording become information errors.

Accordingly, whether the recorded state is good or bad can be determined by detecting the maximum peak duration T of the reflection signal and the minimum peak duration thereof. The manner in which this may be accomplished will be described with reference to FIG. 3 and FIGS. 4(a)–4(g).

FIGS. 4(a) and 4(b) are diagrams corresponding to FIGS. 2(a) and 2(b), respectively. FIG. 4(a) shows an example of the light modulating signal, while FIG. 4(b) shows the reflection signal in FIG. 2(b) in a model-like fashion.

In FIG. 1 the reflected beam received by the light detector 11 is amplified by an amplifier 12, and the amplified signal is applied to a check circuit 13. The arrangement of this check circuit is shown in FIG. 3.

Figure 3:
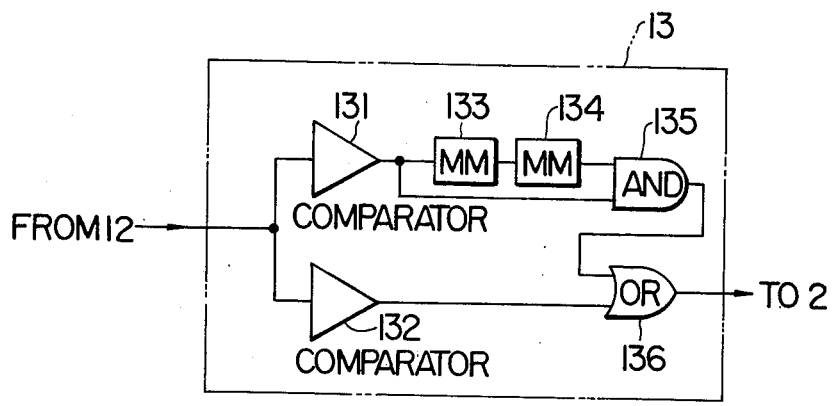
FIG. 3 is a block diagram showing the construction of essential portions in an embodiment of this invention.

Referring to FIG. 3, the reflection signal, shown in FIG. 4(b), is introduced into a comparator 131, pulses of the maximum peak duration time T are detected, as shown in FIG. 4(c), and the detection of the minimum peak duration is performed in a comparator 132, as shown in FIG. 4(d). In FIG. 4(b), the mark * and the mark ** indicate abnormal cases, the former corresponding to the case where no hole is provided in the recording period and the latter to the case where a hole already exists in the nonrecording period. Using monostable multivibrators 133 and 134, pulses having any desired width are generated after T seconds from the rising parts of the pulses shown in FIG. 4(c), as seen in FIG. 4(e). The logical product (AND) of the pulses of FIG. 4(e) with the signal in FIG. 4(c) is provided by means of an AND gate 135. Then, an error check signal, as seen in FIG. 4(f), is obtained from a bit where no hole was produced during the recording period. Further, the logical sum (OR) of the signal shown in FIG. 4(d) and the signal shown in FIG. 4(f) is provided by means of an OR gate 136. Then, error checking of the recorded data can be accomplished. The error signal, as shown in FIG. 4(g), is applied to the signal modulator 2, it is decided that the data now recorded is erroneous, and the same data begins to be recorded in the next sector on the disk again.

Figure 6:
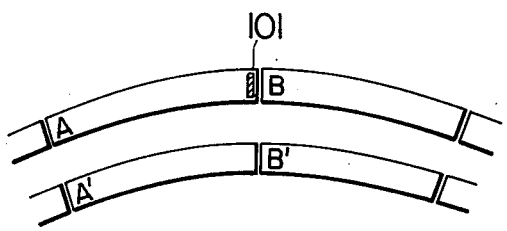
FIG. 6 is a diagram for explaining the recorded state of information.

FIG. 6 shows the recorded state of the disk. On the disk recording is effected sector by sector. Assuming by way of example that data has been recorded in a sector A and that an error has been detected in such recorded data, an error marker 101 is recorded in the rearmost part of the sector to indicate that the data of the sector A is erroneous. Subsequently, the address is renewed, and the same data is recorded in a sector B. If the data has been normally recorded in sector B, the error marker is not recorded.

In the above, there has been explained the case where the recorded state of information is checked by detecting the maximum peak duration and the minimum peak duration. However, this invention is not restricted thereto, but the recorded state of information can also be checked by detecting a decrease in the direct-current component.

Experiments by the inventors have revealed that such decrease in the direct-current component in the event of an error exists, for example, for several hundreds nsec. The detection of such a decrease in the direct-current component of the modulating signal is effective for checking for the presence or absence of a hole especially in the case of spot recording. Here, "spot recording" is a recording wherein a pit (hole) in the same shape as that of the spot of the light beam is formed in the recording medium and wherein the information recording is executed depending upon the presence or absence of the pit. Such recording corresponds to a case where the distance by which the light spot moves on the recording medium within the time interval of illumination of the recording medium by the light beam is smaller than the spot diameter. More specifically, letting d denote the spot diameter, D the diameter of the recording track, N the rotational frequency of the disk, and T the illumination time of the beam, the following relationship is fulfilled:

$$d \gtrsim \pi DN \cdot \Delta T$$

Assuming by way of example that d is 2 μm, N is 4 r.p.s. and D is 200 mm, then ΔT becomes 80 ns.

In such spot recording, as the spot becomes smaller, it becomes more difficult to detect a decrease in the reflection signal in the form of the decrease of the pulse component PL, that is, to detect the maximum peak duration T. Therefore, the decrease of the reflection signal or the existence of a hole can be more reliably checked by the detection of a decrease in the direct-current component DC.

Hereunder, there will be described with reference to the drawings a case where the presence or absence of a hole in the recording medium is checked in such a way that the decreased part of the direct-current component after the illumination with the light beam is detected by comparison with a predetermined threshold value.

Figure 5:
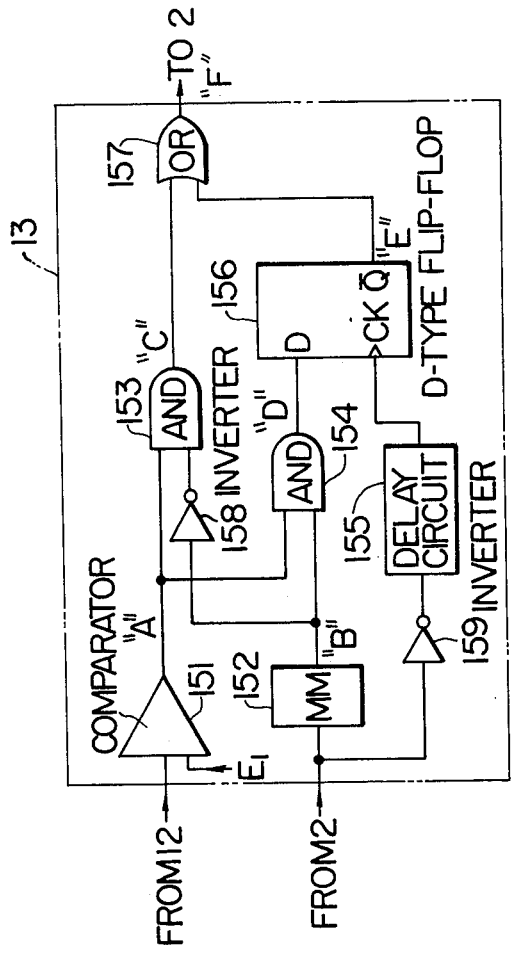
FIG. 5 is a block diagram showing the construction of essential portions in another embodiment of this invention.

FIG. 5 is a circuit diagram showing the construction of an embodiment in the above case, while FIGS. 2(c)–2(h) are waveform diagrams for explaining the operation of this embodiment.

The errors which might be encountered during recording are (1) a case where no hole has been provided, and (2) a case where a hole has been existent in spite of the absence of a recording pulse (a defect in the recording medium, etc.). In FIG. 2(b), the case (1) is indicated by the mark *, and the case (2) by the mark **. The reflected beam received by the light detector 11 is amplified by the amplifier 12, and the resultant signal is fed to the error check circuit 13. The arrangement of this error check circuit 13 is shown in FIG. 5.

Referring to FIG. 5, when the reflection signal, as shown in FIG. 2(b), and a comparing level $E_1$ indicative of the predetermined threshold value are compared in a comparator 151, a waveform A shown in FIG. 2(c) is obtained. Subsequently, a waveform B having a pulse width t (for example, 150 nsec–500 nsec) is generated by a monostable multivibrator 152 at the timing of the falling part of the beam modulating signal (refer to FIG. 2(d)). In order to detect the error of the type indicated by the mark **, the logical product between the waveform A and a signal obtained by inverting the waveform B by means of an inverter 158 may be obtained by means of an AND gate 153, represented by waveform C in FIG. 2(g). In the detection of the error of the type indicated by the mark *, the logical product between the waveform A and the waveform B is obtained by means of an AND gate 154, represented by the waveform D in FIG. 2(e). Thereafter, this waveform is applied to the pin D of a D-type flip-flop 156. A signal obtained by inverting the beam modulating signal by means of an inverter 159 is delayed by Δt (for example, about 50 nsec) by means of a delay circuit 155, and is applied to the pin for a clock signal (CK) of the D-type flip-flop 156. Then, at the rising part of the signal of the pin CK, a level at the pin D is fed to the pin for output (Q) of the flip-flop, and hence, a waveform E, as shown in FIG. 2(f), is obtained at the output pin Q.

A waveform F, shown in FIG. 2(h), is obtained in such a way that the waveform E representative of the occurrence of the error of the type indicated by the mark * and the waveform C representative of the occurrence of the error of the type indicated by the mark ** have their logical sum taken by means of an OR gate 157, and the output thereof becomes the check signal indicating the errors which have occurred during the recording period.

When an error check signal has been developed and it is decided therefrom that an error has occurred in data now recorded, the same data is recorded in a different location, as explained with reference to FIG. 6. Thus, data recording free from any error is always provided.

The above embodiments have been explained as employing a diode laser for the recording light source. It has been verified, however, that similar results are obtained where gaseous lasers (for example, He-Ne laser and Ar laser) have been used.

As set forth above, according to this invention, the information recording apparatus capable of error checking as to whether or not a signal has been certainly recorded can be provided for spot recording in which data is recorded depending upon the presence or absence of a hole in the medium.

What is claimed is:

1. In an information recording apparatus having a signal source for generating digital information, light beam generating means for generating a light beam modulated by the digital information, and optical means for focusing the light beam from the light beam generating means onto a predetermined recording medium having a reflectivity to said light beam which changes by a predetermined amount in a given time of irradiation; the improvement comprising first detection means for detecting said light beam after it is reflected from said recording medium, second detection means for detecting a change in the output of said first detection means resulting from a change by said predetermined amount in the quality of light reflected from said recording medium and for producing an output representative thereof, and error detecting means for checking the recorded state of the information as it is recorded on said medium solely on the basis of the output of said second detection means.

2. An information recording apparatus according to claim 1, wherein said second detection means includes means for detecting a predetermined maximum peak value and a predetermined minimum peak value in said output of said first detection means and said error detecting means includes logical means for generating an error signal on the basis of said detected maximum or minimum peak values.

3. An information recording apparatus according to claim 2, wherein said second detection means includes a comparator responsive to the output of said first detection means for generating a first signal in response to detection of said predetermined maximum peak value, and wherein said logical means includes means for generating a second signal a predetermined time after start of generation of said first signal and means for effecting the logical product of said first and second signals.

4. An information recording apparatus according to claim 3, wherein said second detection means includes a second comparator responsive to the output of said first detection means for generating a third signal when said output falls below said predetermined minimum peak value, and wherein said logical means includes means for summing said third signal with the output of said logical product effecting means.

5. An information recording apparatus according to claim 2, wherein said second detection means includes a comparator responsive to the output of said first detection means for generating a signal when said output falls below said predetermined minimum peak value.

6. An information recording apparatus according to claim 1, wherein said second detection means includes means for detecting a change in a direct-current component of said output of said first detection means and said error detecting means includes logical means for generating an error signal on the basis of said detected change in said direct-current component.

7. An information recording apparatus according to claim 6, wherein said second detection means includes a comparator responsive to the output of said first detection means for generating a first signal when said direct current component deviates from a predetermined value, and wherein said logical means includes means for comparing said first signal to said digital information being recorded and for generating an error signal in response thereto.

8. An information recording apparatus according to claim 7, wherein said comparing means includes an inverter, means for applying a signal representing said digital information to said inverter, and means providing the logical product of said first signal and the output of said inverter.

9. An information recording apparatus according to claim 8, wherein said logical means further includes a flip-flop having one input connected to the output of said logical product providing means and a second inverter and a delay circuit connected in series between the output of said digital information applying means and a second input of said flip-flop.

10. An information recording apparatus according to claim 9, further including a second inverter for inverting said signal representing said digital information, additional means providing the logical product of said first signal and the output of said second inverter, and means for summing the outputs of said flip-flop and said additional logical product providing means.

11. In an information recording apparatus having a signal source for generating digital information, light beam generating means for generating light beam modulated by the digital information, and optical means for focusing the light beam from the light beam generating means onto a predetermined recording medium having a reflectivity thereof to said light beam which lowers during the period of irradiation of said light beam as a result of the formation of a hole in said recording medium;

the improvement comprising first detection means for detecting said light beam after it is reflected from said recording medium, second detection means for detecting a change of an output of said first detecting means in accordance with a change in the quantity of light of said reflected light beam corresponding to a change of the reflectivity of said recording medium;

and error detecting means for checking the recorded state of the information recorded on said medium solely on the basis of the output of said second detection means.

12. In an information recording apparatus having a signal source for generating digitial information, light beam generating means for generating a light beam modulated by the digital information, and optical means for focusing the light beam from said light beam generating means onto selected areas of a recording medium having a reflectivity to said light beam which changes by a predetermined amount in a given time of irradiation to produce in said medium a plurality of areas of first or second reflectivity representing said digital information; the improvement comprising detection means for detecting said light beam after it is reflected from said recording medium; comparator means connected to said detection means for producing an output signal when the output of said detection means exceeds a reference level; delay means for delaying said output signal for at least said given time; and logic means responsive to the output of said delay means and said output signal of said comparator means for producing an error signal.

13. An information recording apparatus according to claim 12, further including additional comparator means connected to said detection means for producing an additional error signal when the output of said detection means falls below a minimum reference level.

14. An information recording apparatus according to claim 12, wherein said logic means comprises an AND gate, and further including an OR gate connected to receive the outputs of said AND gate and said additional comparator means.

* * * * *